United States Patent
Toyama

[19]

[11] Patent Number: 6,040,948
[45] Date of Patent: Mar. 21, 2000

[54] THREE-GROUP ZOOM LENS HAVING A FIRST POSITIVE REFRACTING LENS GROUP, A SECOND POSITIVE REFRACTING LENS GROUP AND A THIRD NEGATIVE REFRACTING LENS GROUP

[75] Inventor: Nobuaki Toyama, Omiya, Japan

[73] Assignee: Fuji Photo Optical Co., Ltd., Saitama, Japan

[21] Appl. No.: 09/022,055

[22] Filed: Feb. 12, 1998

[30] Foreign Application Priority Data

Mar. 24, 1997  [JP]  Japan .................................. 9-090103

[51] Int. Cl.$^7$ .................................................. G02B 15/14
[52] U.S. Cl. ............................................................ 359/689
[58] Field of Search ..................................... 359/689, 686

[56] References Cited

U.S. PATENT DOCUMENTS

| | | | |
|---|---|---|---|
| 4,854,683 | 8/1989 | Ozawa | 359/689 |
| 4,909,613 | 3/1990 | Kikuchi | 359/689 |
| 5,144,489 | 9/1992 | Shibayama | 359/689 |

*Primary Examiner*—Ricky Mack
*Attorney, Agent, or Firm*—Snider & Associates; Ronald R. Snider

[57] ABSTRACT

In a zoom lens comprising three lens groups of positive, positive, and negative in which, upon changing power from its wide angle end to telephoto end, all the three lens groups are moved toward the object side while changing distances between the lens groups, so as to attain variable power; each lens form of the first lens group is specified, and predetermined conditional expressions are satisfied, so as to yield optical performances which are satisfactory to professionals and high-standard amateurs. Upon changing the power from the wide angle end to telephoto end, the air gap between the first lens group $G_1$ and the second lens group $G_2$ increases, while the air gap between the second lens group $G_2$ and the third lens group $G_3$ decreases. Further, this zoom lens satisfies the following conditional expressions (1) to (3):

$$2.2 \leq f_2/f_1 \leq 6.6 \tag{1}$$

$$2.2 \leq f_2/f_w \leq 5.0 \tag{2}$$

$$-1.1 \leq R_3/f_w \leq 0.5 \tag{3}$$

3 Claims, 17 Drawing Sheets

FIG.3A-1
EXAMPLE 1
WIDE ANGLE END
F/4.64

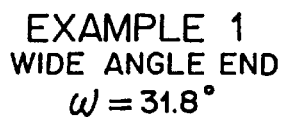

FIG.3A-2
EXAMPLE 1
WIDE ANGLE END
ω = 31.8°

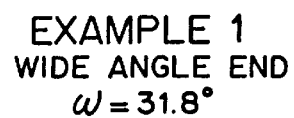

FIG.3A-3
EXAMPLE 1
WIDE ANGLE END
ω = 31.8°

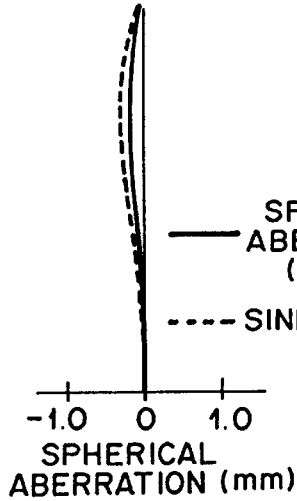

—— SPHERICAL ABERRATION (d-LINE)
---- SINE CONDITION

-1.0   0   1.0
SPHERICAL ABERRATION (mm)

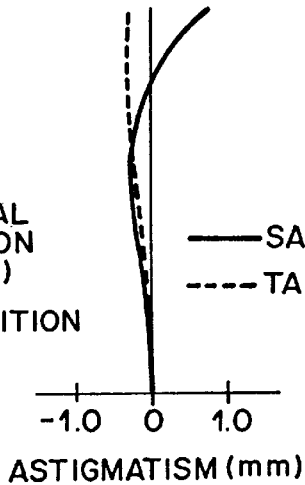

—— SAGITTAL
---- TANGENTIAL

-1.0   0   1.0
ASTIGMATISM (mm)

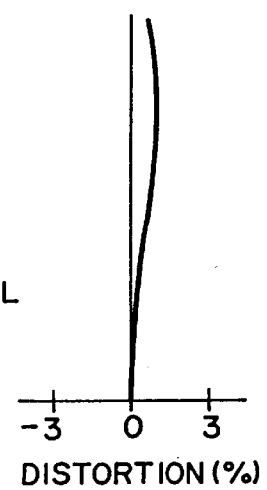

-3   0   3
DISTORTION (%)

FIG.3B-1
EXAMPLE 1
TELEPHOTO END
F/7.19

FIG.3B-2
EXAMPLE 1
TELEPHOTO END
ω = 22.1°

FIG.3B-3
EXAMPLE 1
TELEPHOTO END
ω = 22.1°

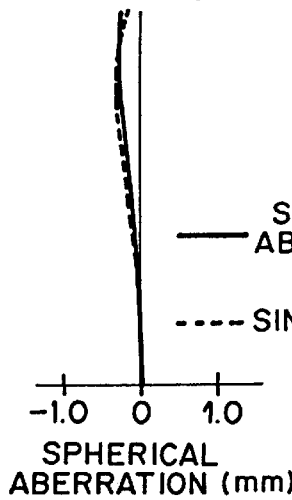

—— SPHERICAL ABERRATION (d-LINE)
---- SINE CONDITION

-1.0   0   1.0
SPHERICAL ABERRATION (mm)

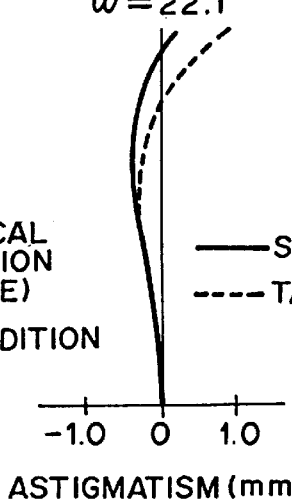

—— SAGITTAL
---- TANGENTIAL

-1.0   0   1.0
ASTIGMATISM (mm)

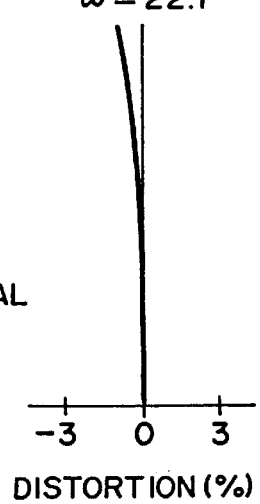

-3   0   3
DISTORTION (%)

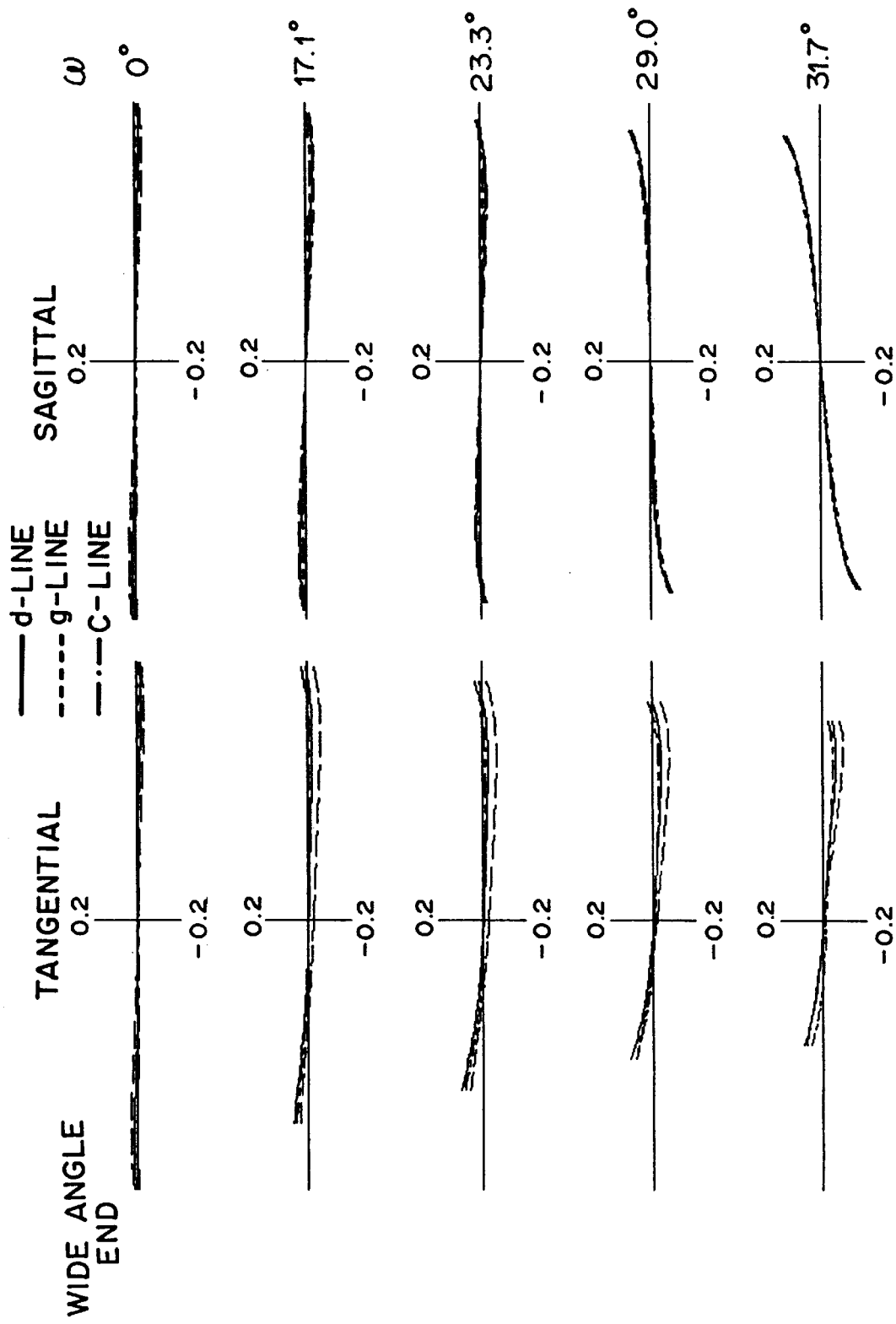

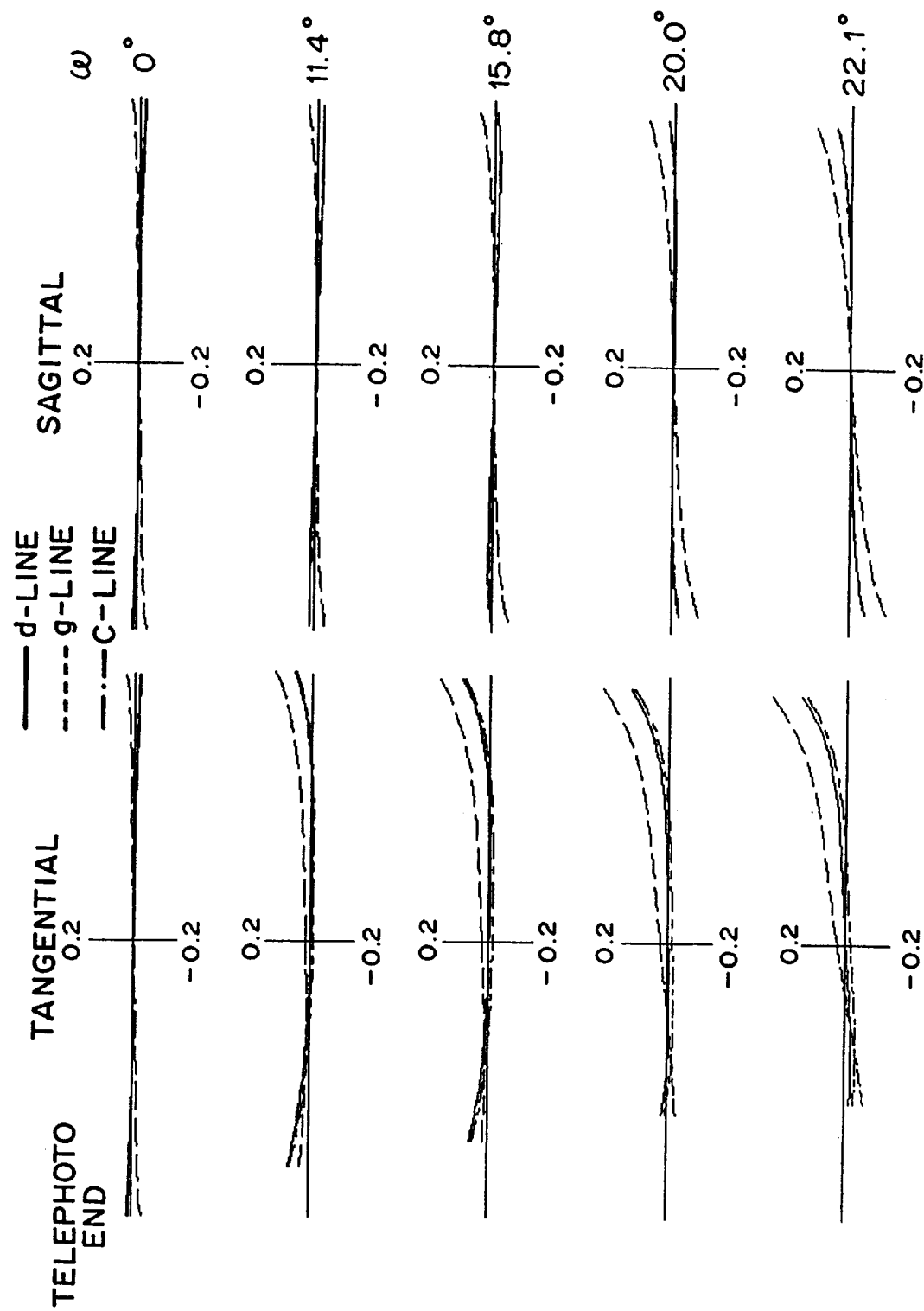
FIG.5 EXAMPLE 1 COMA TELEPHOTO END

EXAMPLE 2
WIDE ANGLE END
F/4.66

EXAMPLE 2
WIDE ANGLE END
$\omega = 31.9°$

EXAMPLE 2
WIDE ANGLE END
$\omega = 31.9°$

EXAMPLE 2
TELEPHOTO END
F/7.25

EXAMPLE 2
TELEPHOTO END
$\omega = 22.3°$

EXAMPLE 2
TELEPHOTO END
$\omega = 22.3°$

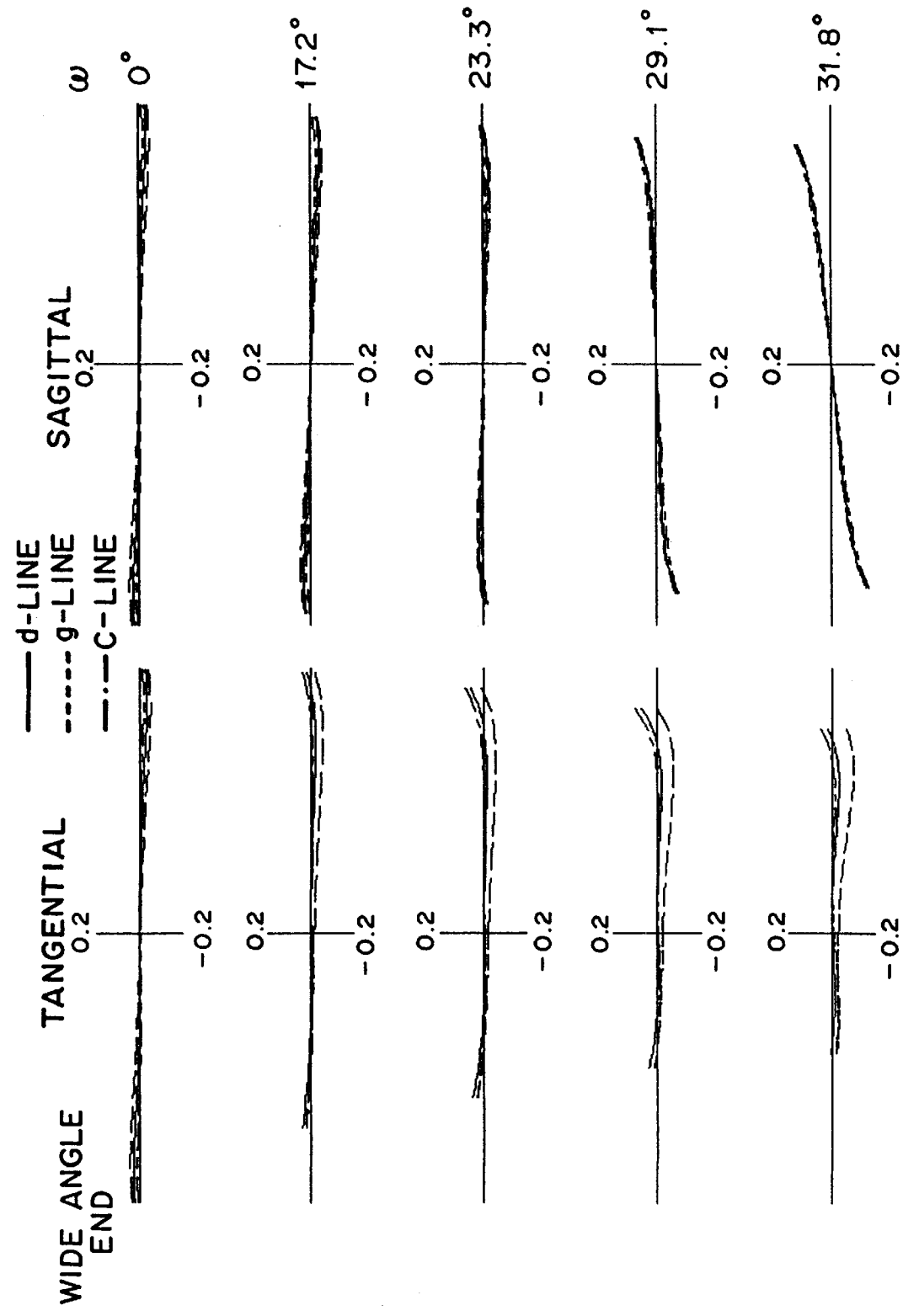

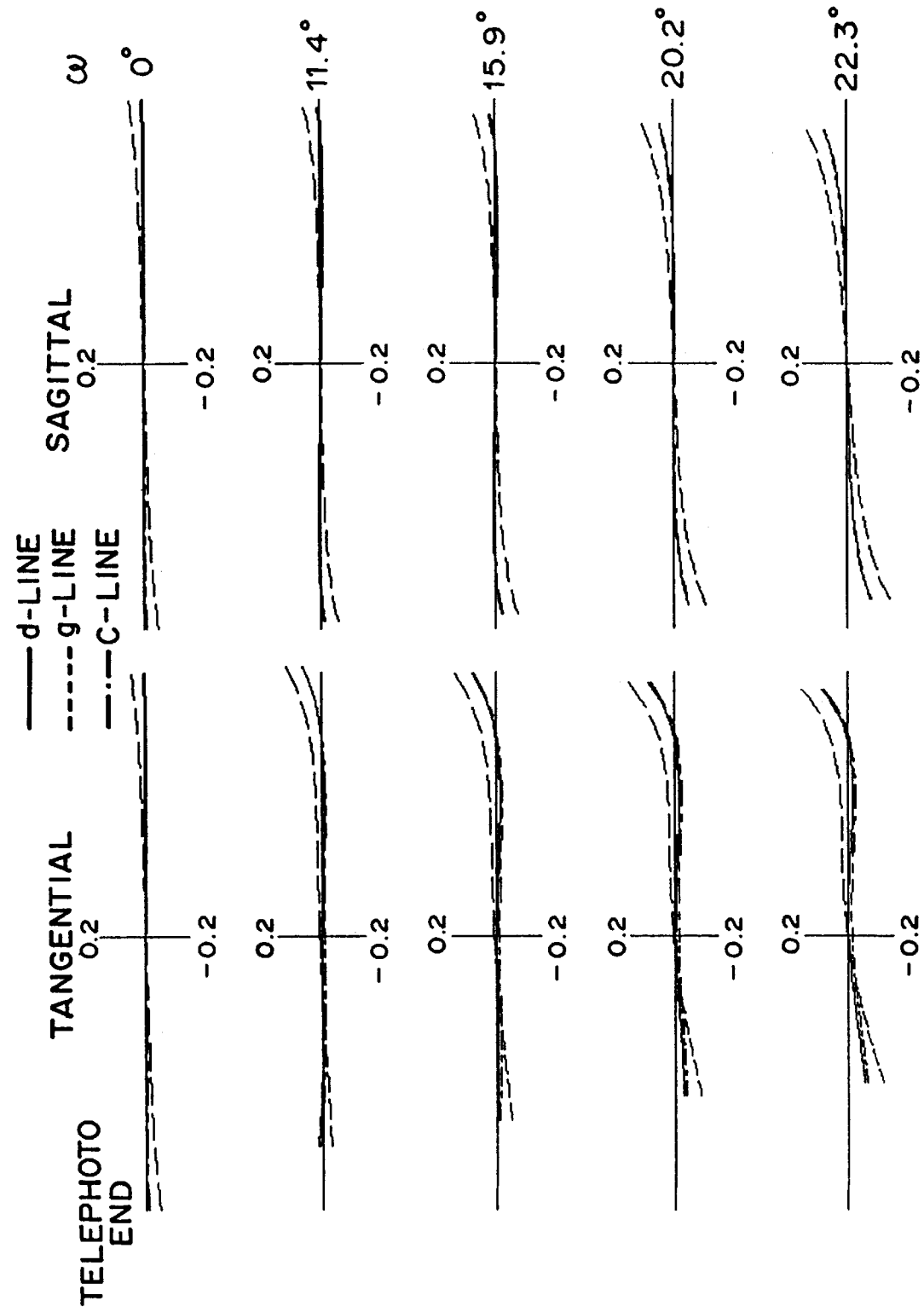

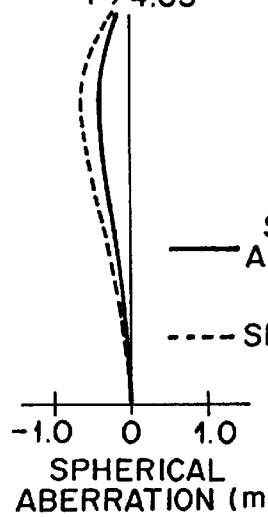

FIG. 9A-1
EXAMPLE 3
WIDE ANGLE END
F/4.65

SPHERICAL ABERRATION (mm)
—— SPHERICAL ABERRATION (d-LINE)
---- SINE CONDITION

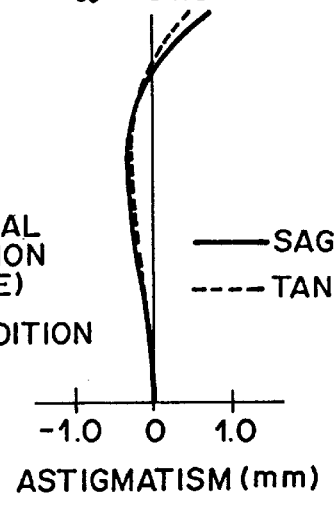

FIG. 9A-2
EXAMPLE 3
WIDE ANGLE END
ω = 31.5°

ASTIGMATISM (mm)
—— SAGITTAL
---- TANGENTIAL

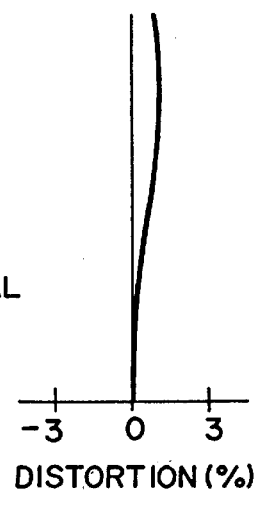

FIG. 9A-3
EXAMPLE 3
WIDE ANGLE END
ω = 31.5°

DISTORTION (%)

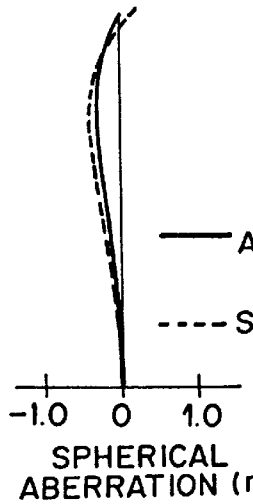

FIG. 9B-1
EXAMPLE 3
TELEPHOTO END
F/7.23

SPHERICAL ABERRATION (mm)
—— SPHERICAL ABERRATION (d-LINE)
---- SINE CONDITION

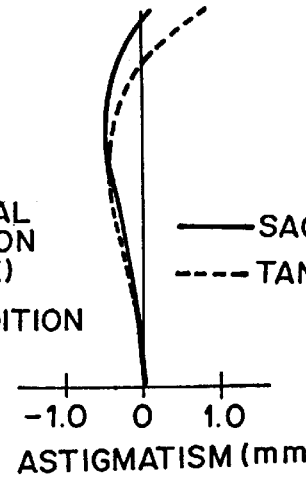

FIG. 9B-2
EXAMPLE 3
TELEPHOTO END
ω = 21.9°

ASTIGMATISM (mm)
—— SAGITTAL
---- TANGENTIAL

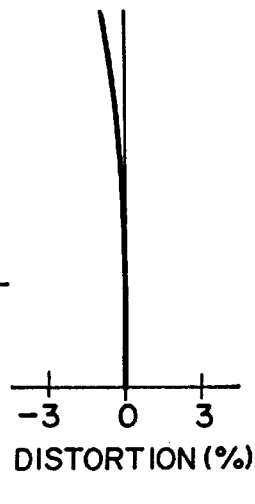

FIG. 9B-3
EXAMPLE 3
TELEPHOTO END
ω = 21.9°

DISTORTION (%)

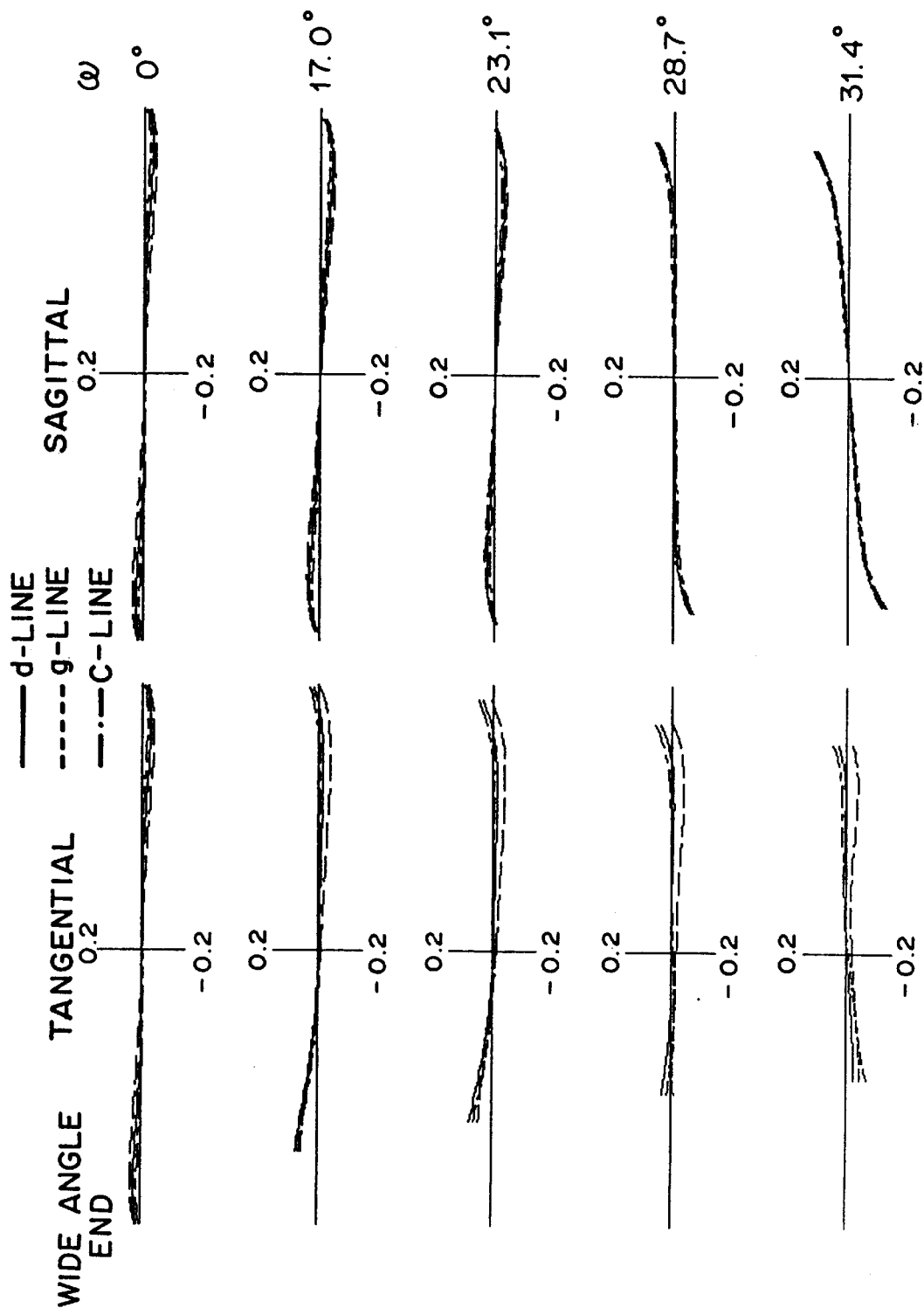

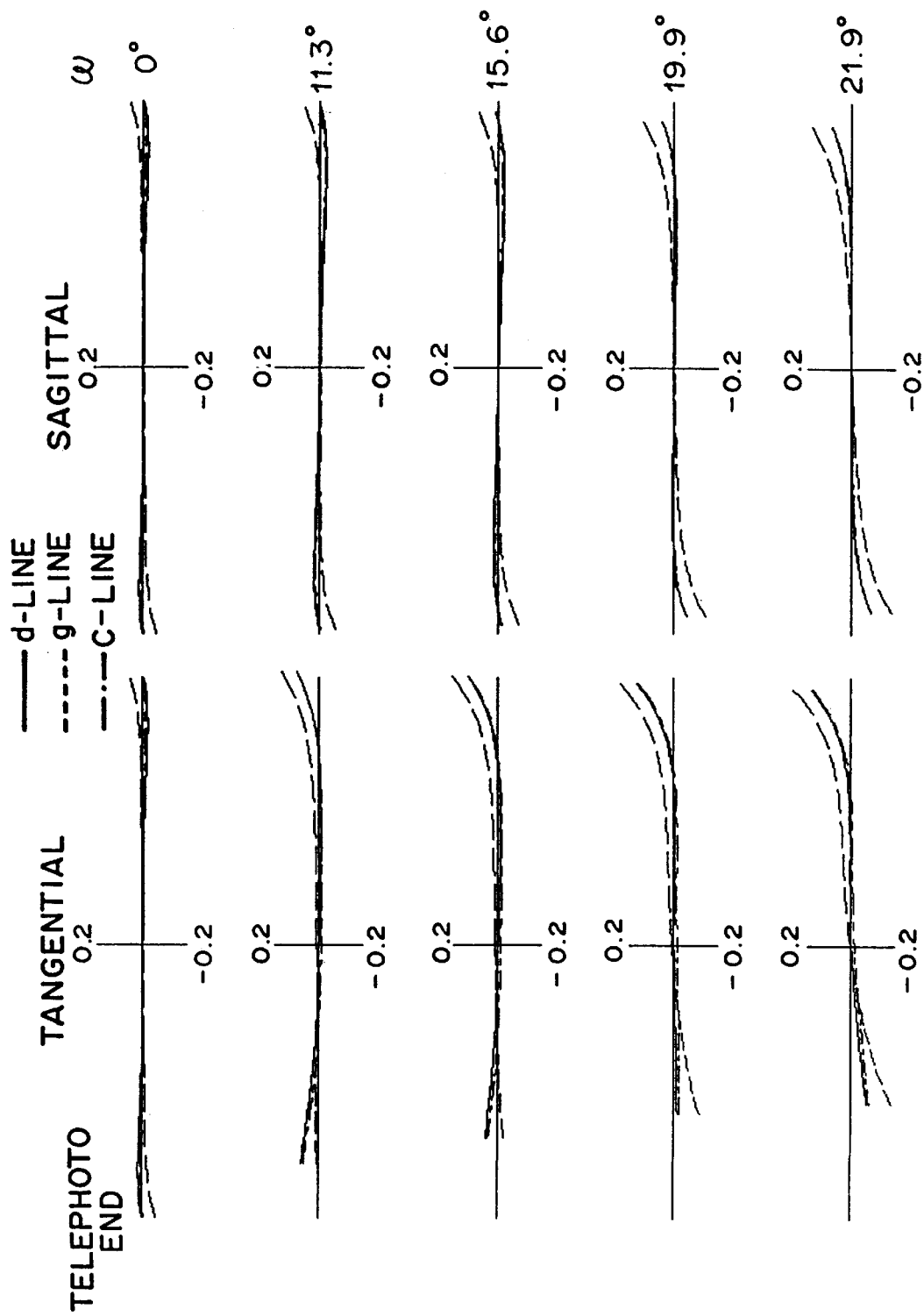
FIG.11 EXAMPLE 3 COMA

FIG.12A-1
EXAMPLE 4
WIDE ANGLE END
F./4.65

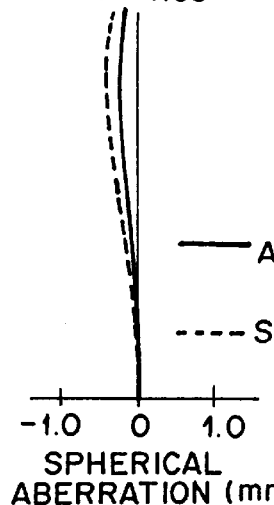

—— SPHERICAL ABERRATION (d-LINE)
---- SINE CONDITION

SPHERICAL ABERRATION (mm)

FIG.12A-2
EXAMPLE 4
WIDE ANGLE END
$\omega = 31.9°$

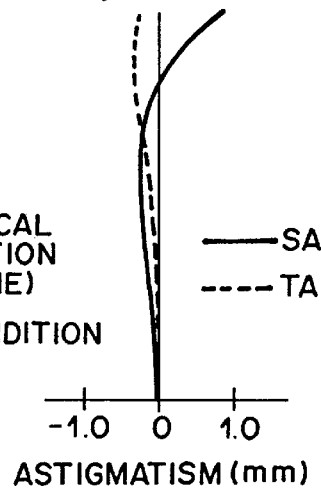

—— SAGITTAL
---- TANGENTIAL

ASTIGMATISM (mm)

FIG.12A-3
EXAMPLE 4
WIDE ANGLE END
$\omega = 31.9°$

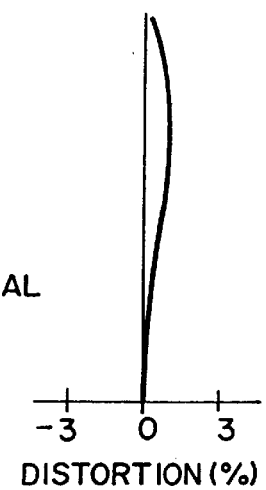

DISTORTION (%)

FIG.12B-1
EXAMPLE 4
TELEPHOTO END
F/7.23

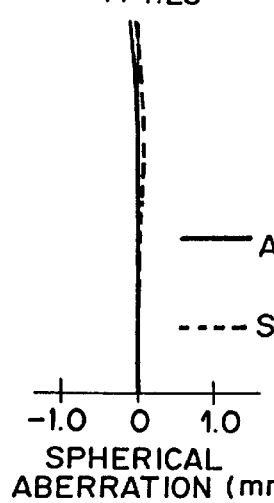

—— SPHERICAL ABERRATION (d-LINE)
---- SINE CONDITION

SPHERICAL ABERRATION (mm)

FIG.12B-2
EXAMPLE 4
TELEPHOTO END
$\omega = 22.2°$

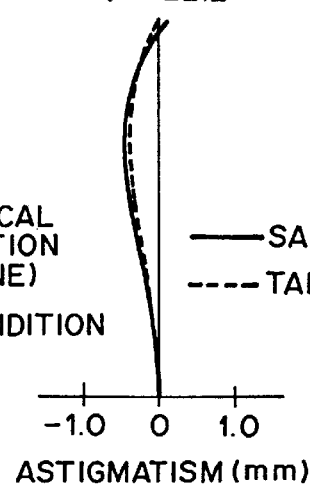

—— SAGITTAL
---- TANGENTIAL

ASTIGMATISM (mm)

FIG.12B-3
EXAMPLE 4
TELEPHOTO END
$\omega = 22.2°$

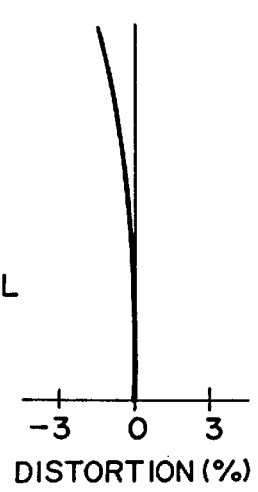

DISTORTION (%)

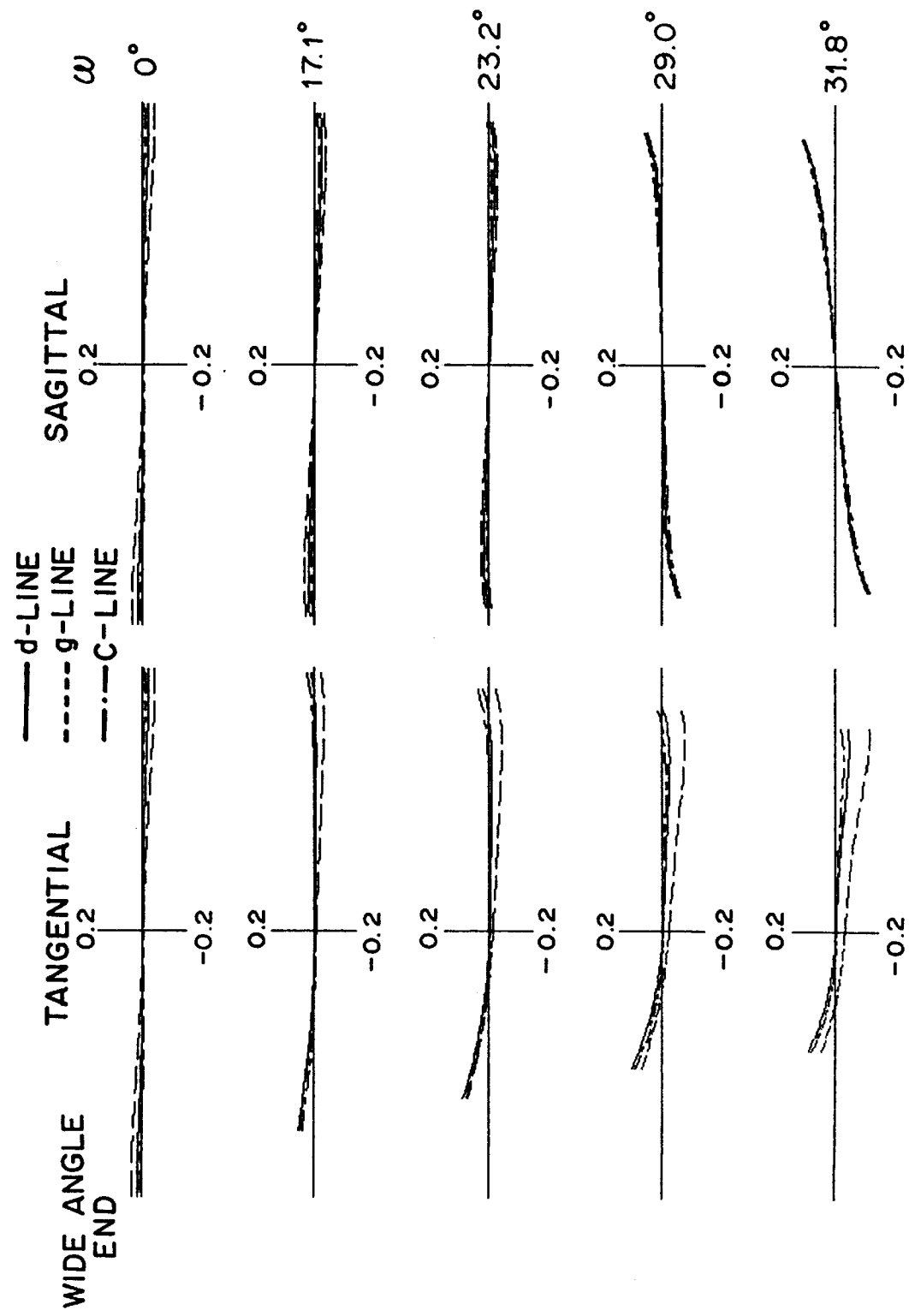

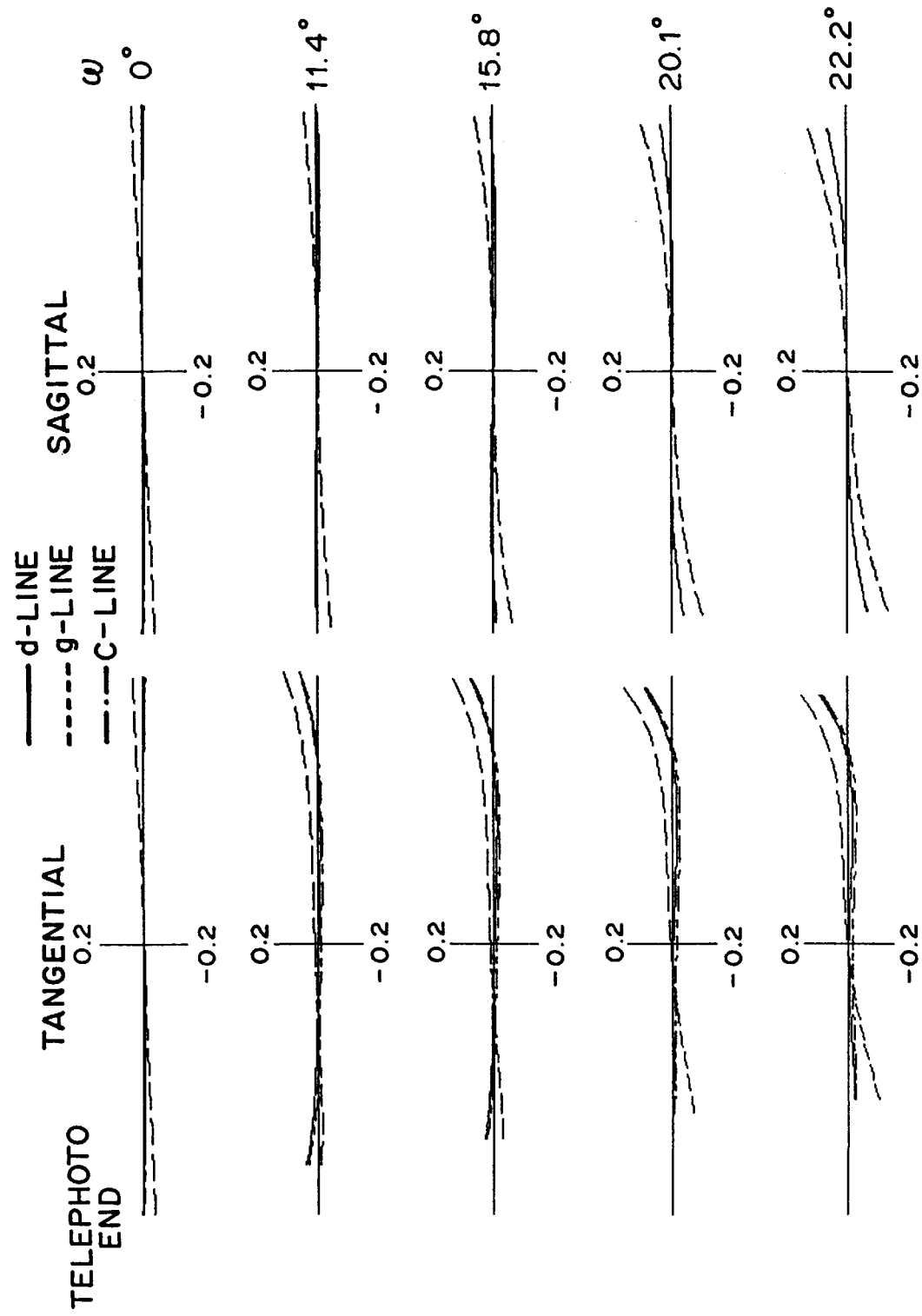

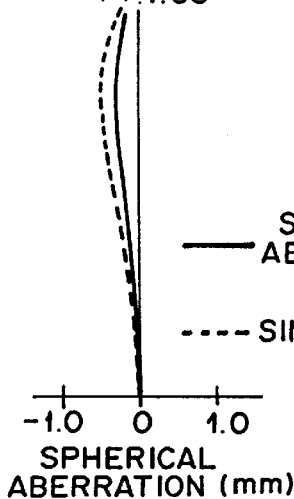

FIG.15A-1
EXAMPLE 5
WIDE ANGLE END
F/4.66

—— SPHERICAL ABERRATION (d-LINE)
---- SINE CONDITION

SPHERICAL ABERRATION (mm)

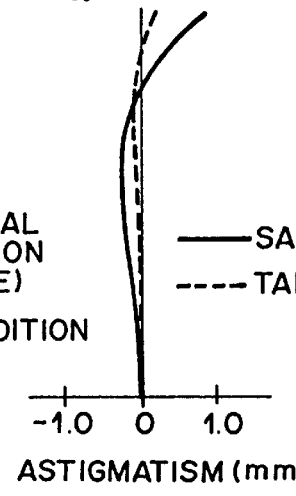

FIG.15A-2
EXAMPLE 5
WIDE ANGLE END
$\omega = 31.7°$

—— SAGITTAL
---- TANGENTIAL

ASTIGMATISM (mm)

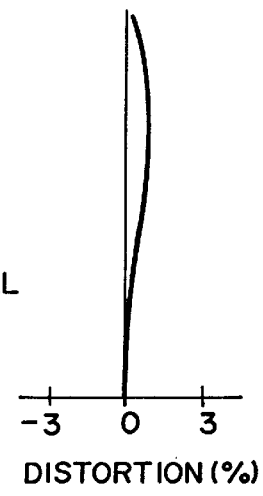

FIG.15A-3
EXAMPLE 5
WIDE ANGLE END
$\omega = 31.7°$

DISTORTION (%)

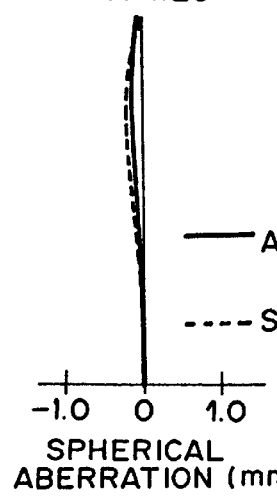

FIG.15B-1
EXAMPLE 5
TELEPHOTO END
F/7.20

—— SPHERICAL ABERRATION (d-LINE)
---- SINE CONDITION

SPHERICAL ABERRATION (mm)

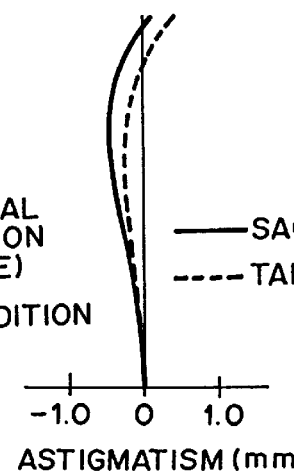

FIG.15B-2
EXAMPLE 5
TELEPHOTO END
$\omega = 22.1°$

—— SAGITTAL
---- TANGENTIAL

ASTIGMATISM (mm)

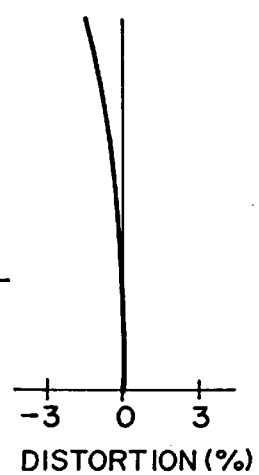

FIG.15B-3
EXAMPLE 5
TELEPHOTO END
$\omega = 22.1°$

DISTORTION (%)

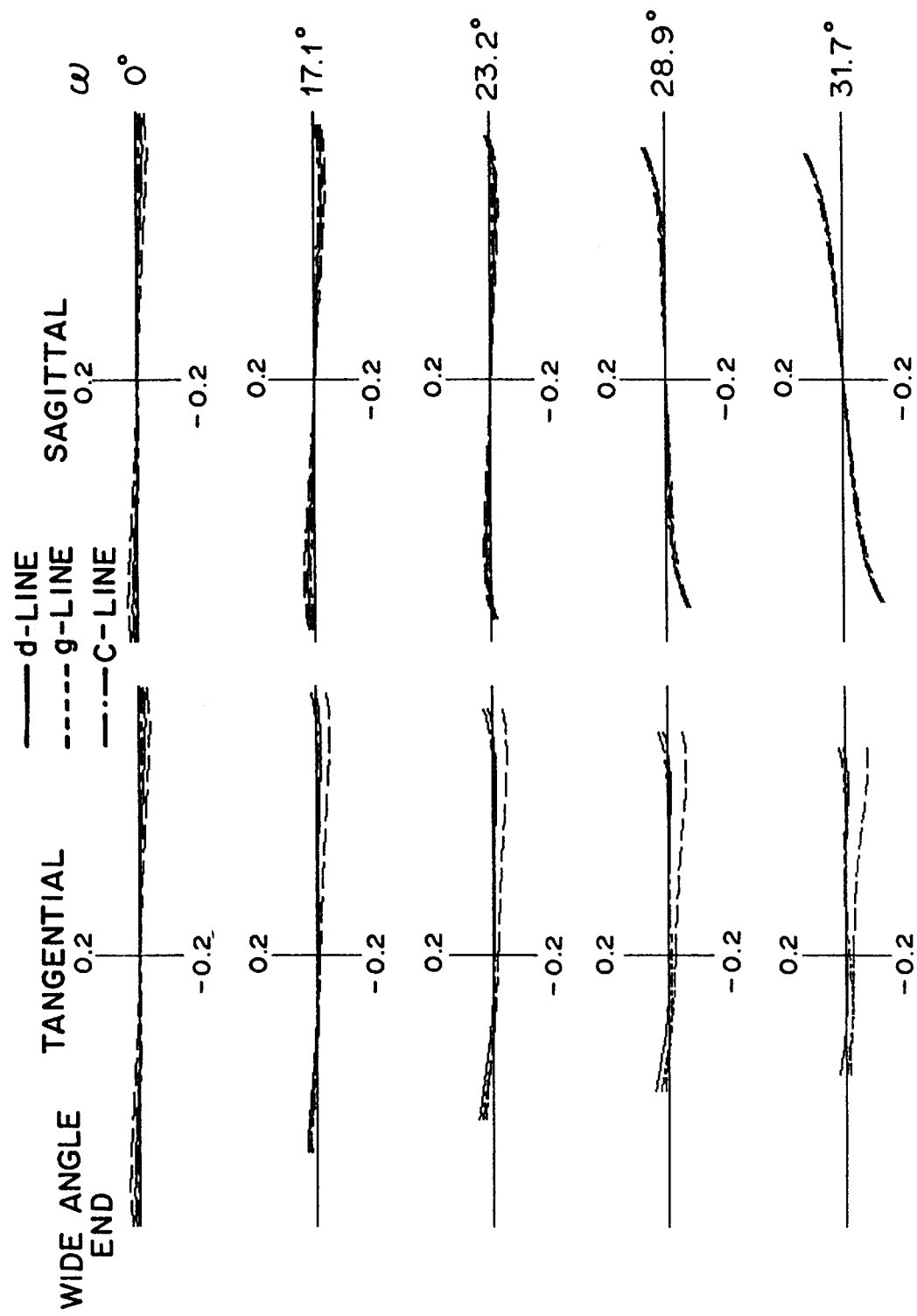

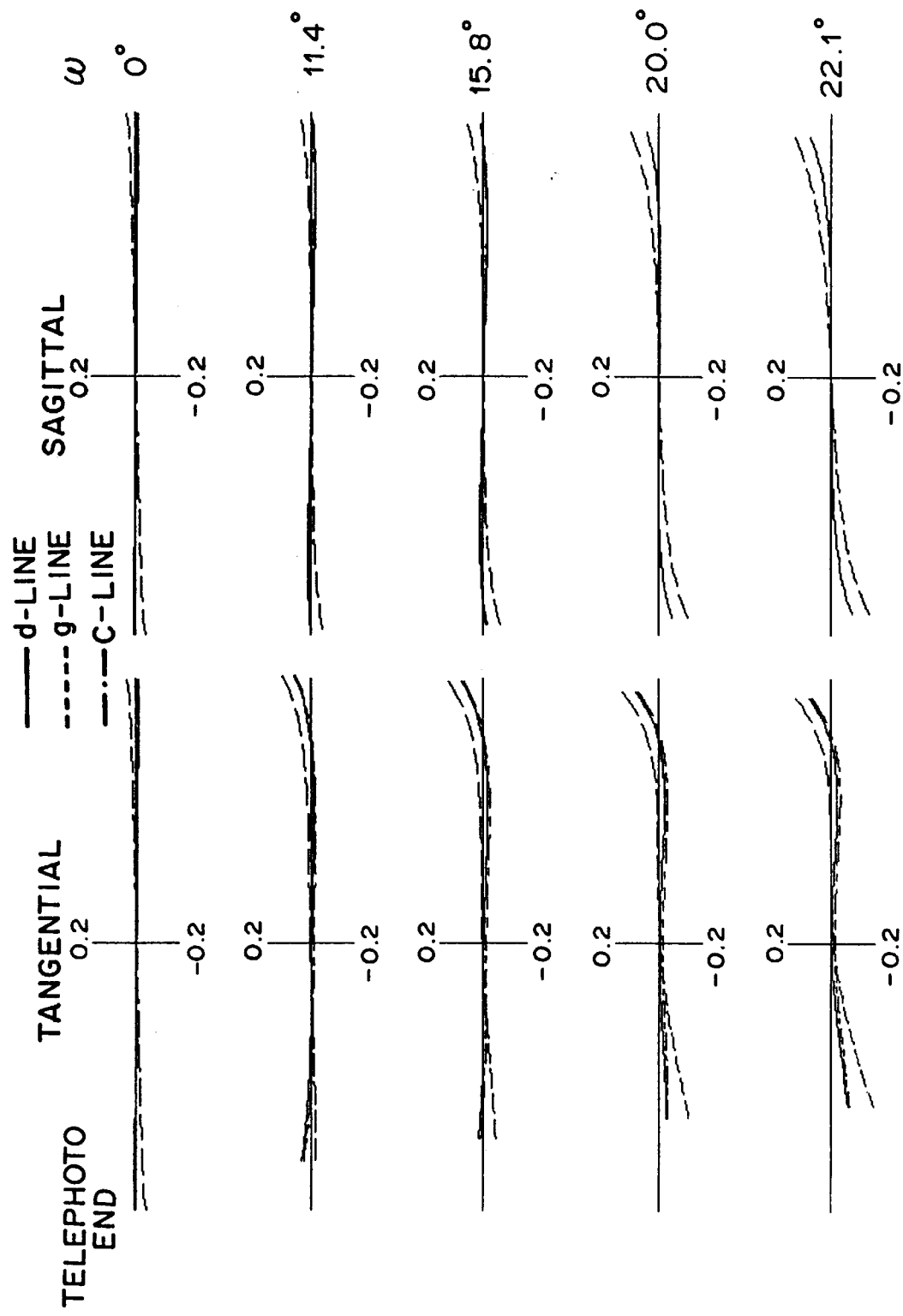
FIG.17 EXAMPLE 5 COMA

THREE-GROUP ZOOM LENS HAVING A FIRST POSITIVE REFRACTING LENS GROUP, A SECOND POSITIVE REFRACTING LENS GROUP AND A THIRD NEGATIVE REFRACTING LENS GROUP

RELATED APPLICATIONS

This application claims the priority of Japanese Patent Application No. 9-90103 filed on Mar. 24, 1997, which is incorporated herein by reference.

BACKGROUND OF THE INVENTION

1. Field of the Invention

The present invention relates to a zoom lens composed of three groups suitable for a lens-shutter camera or the like and, in particular, to a three-group zoom lens incorporated in a camera used by professionals or high-standard amateurs for which a high image quality is required.

2. Description of the Prior Art

Recently, as a lens system used in a lens-shutter camera, the one equipped with a zoom lens has been constituting the mainstream. Since it is required for such a zoom lens to have a compact size to begin with, a two-group zoom lens of a telephoto type refracting power arrangement comprising a first lens group having a positive refracting power and a second lens group having a negative refracting power has been put into practical use.

Meanwhile, since lens-shutter cameras used by professionals or high-standard amateurs require a high image quality in general, known as a zoom lens incorporated in such a camera is a three-group zoom lens in which the above-mentioned first lens group is divided into two positive lens groups, so as to yield a refracting power group arrangement of positive, positive, and negative as a whole, thereby securing a favorable image quality.

Known as a typical technique for achieving a high image quality of a zoom lens while reducing its size is the one in which the number of lens sheets is increased. When simply increasing the number of lens sheets, however, the lens as a whole becomes larger in size. In particular, when a wider angle and a higher image quality are to be obtained, the front lens enhances its diameter so that it becomes difficult for the lens to be built into the main body of the camera.

SUMMARY OF THE INVENTION

In view of such circumstances, it is an object of the present invention to provide a compact three-group zoom lens exhibiting favorable optical performances in its whole variable power range, while securing a predetermined angle of view at its wide angle end.

The present invention provides a three-group zoom lens comprising, successively from an object side, a first lens group having a positive refracting power, a second lens group having a positive refracting power, and a third lens group having a negative refracting power, in which, upon changing power from a wide angle end to a telephoto end, the three lens groups are moved toward the object side while changing a distance between the lens groups, so as to change the power;

wherein the first lens group comprises, successively from the object side, a positive first lens having a convex surface directed onto the object side, a negative second lens having a concave surface directed onto the object side, a positive third lens, and a fourth lens composed of at least one sheet each of positive and negative lenses; and wherein the following conditional expressions:

$$2.2 \leq f_2/f_1 \leq 6.6 \quad (1)$$

$$2.2 \leq f_2/f_w \leq 5.0 \quad (2)$$

$$-1.1 \leq R_3/f_w \leq -0.5 \quad (3)$$

wherein $f_1$ is a focal length of the first lens group;

$f_2$ is a focal length of the second lens group;

$f_w$ is a focal length of the whole system at the wide angle end; and $R_3$ is a radius of curvature of a surface of the second lens on the object side are satisfied.

Preferably, the zoom lens is configured such that, upon changing the power from the wide angle end to the telephoto end, an air gap between the first lens group and the second lens group increases, while an air gap between the second lens group and the third lens group decreases.

Preferably, the third lens group is constituted by four sheets of lenses.

BRIEF DESCRIPTION OF THE DRAWINGS

FIGS. 3A-1 to 3B-3 are aberration charts showing spherical aberration, astigmatism, and distortion of the three-group zoom lens in accordance with Example 1 of the present invention at its wide angle end and telephoto end;

FIG. 4 is an aberration chart showing coma of the three-group zoom lens in accordance with Example 1 of the present invention at its wide angle end;

FIG. 5 is an aberration chart showing coma of the three-group zoom lens in accordance with Example 1 of the present invention at its telephoto end;

FIGS. 6A-1 to 6B-3 are aberration charts showing spherical aberration, astigmatism, and distortion of the three-group zoom lens in accordance with Example 2 of the present invention at its wide angle end and telephoto end;

FIG. 7 is an aberration chart showing coma of the three-group zoom lens in accordance with Example 2 of the present invention at its wide angle end;

FIG. 8 is an aberration chart showing coma of the three-group zoom lens in accordance with Example 2 of the present invention at its telephoto end;

FIGS. 9A-1 to 9B-3 are aberration charts showing spherical aberration, astigmatism, and distortion of the three-group zoom lens in accordance with Example 3 of the present invention at its wide angle end and telephoto end;

FIG. 10 is an aberration chart showing coma of the three-group zoom lens in accordance with Example 3 of the present invention at its wide angle end;

FIG. 11 is an aberration chart showing coma of the three-group zoom lens in accordance with Example 3 of the present invention at its telephoto end;

FIGS. 12A-1 to 12B-3 are aberration charts showing spherical aberration, astigmatism, and distortion of the three-group zoom lens in accordance with Example 4 of the present invention at its wide angle end and telephoto end;

FIG. 13 is an aberration chart showing coma of the three-group zoom lens in accordance with Example 4 of the present invention at its wide angle end;

FIG. 14 is an aberration chart showing coma of the three-group zoom lens in accordance with Example 4 of the present invention at its telephoto end;

FIGS. 15A-1 to 15B-3 are aberration charts showing spherical aberration, astigmatism, and distortion of the three-group zoom lens in accordance with Example 5 of the present invention at its wide angle end and telephoto end;

FIG. 16 is an aberration chart showing coma of the three-group zoom lens in accordance with Example 5 of the present invention at its wide angle end; and FIG. 17 is an aberration chart showing coma of the three-group zoom lens in accordance with Example 5 of the present invention at its telephoto end.

DESCRIPTION OF THE PREFERRED EMBODIMENTS

In the following, embodiments of the present invention will be explained with reference to the accompanying drawings.

Figure 1:
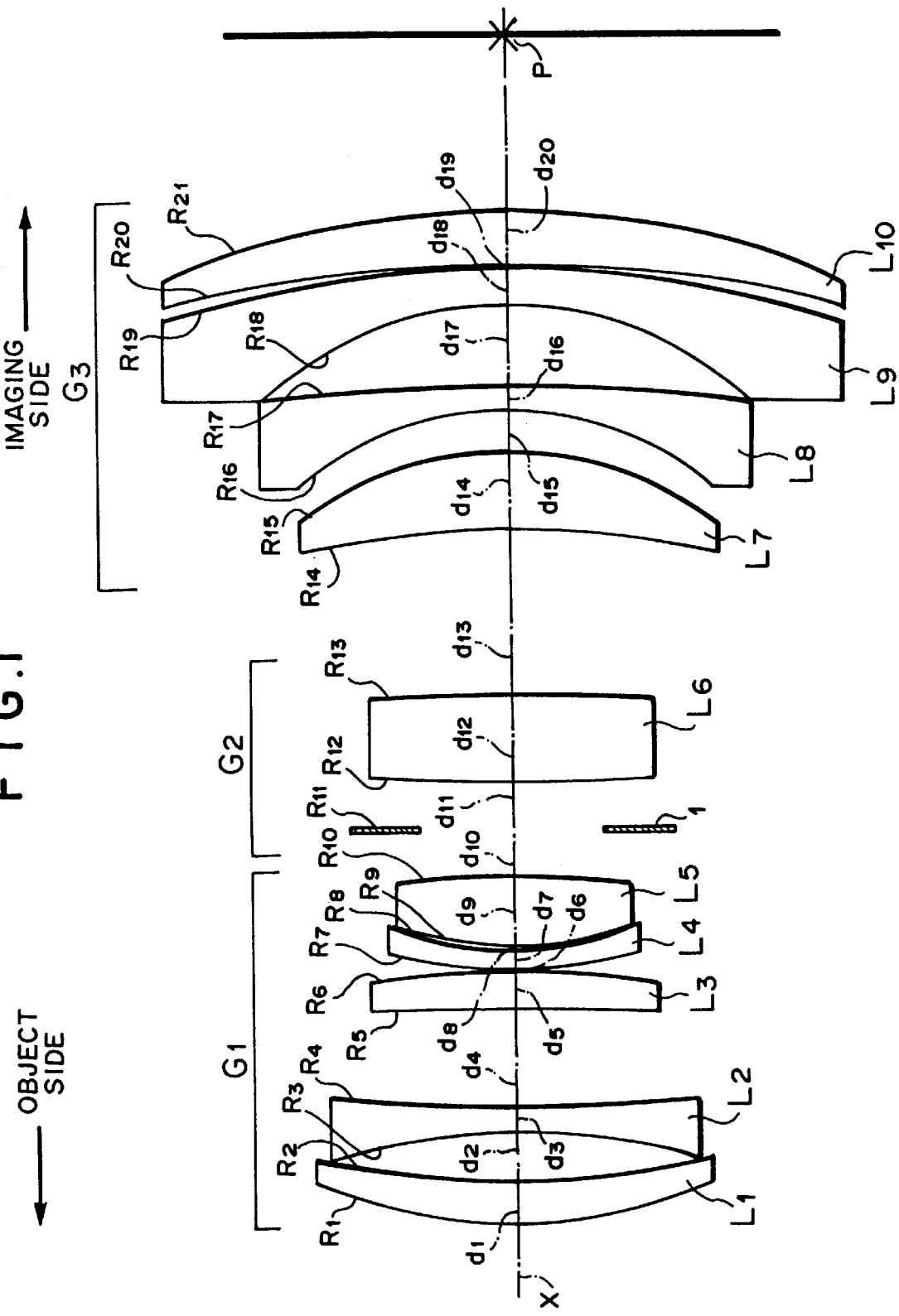
FIG. 1 is a schematic view showing a basic lens configuration of a three-group lens in accordance with an embodiment of the present invention at its wide angle end.
Figure 2:
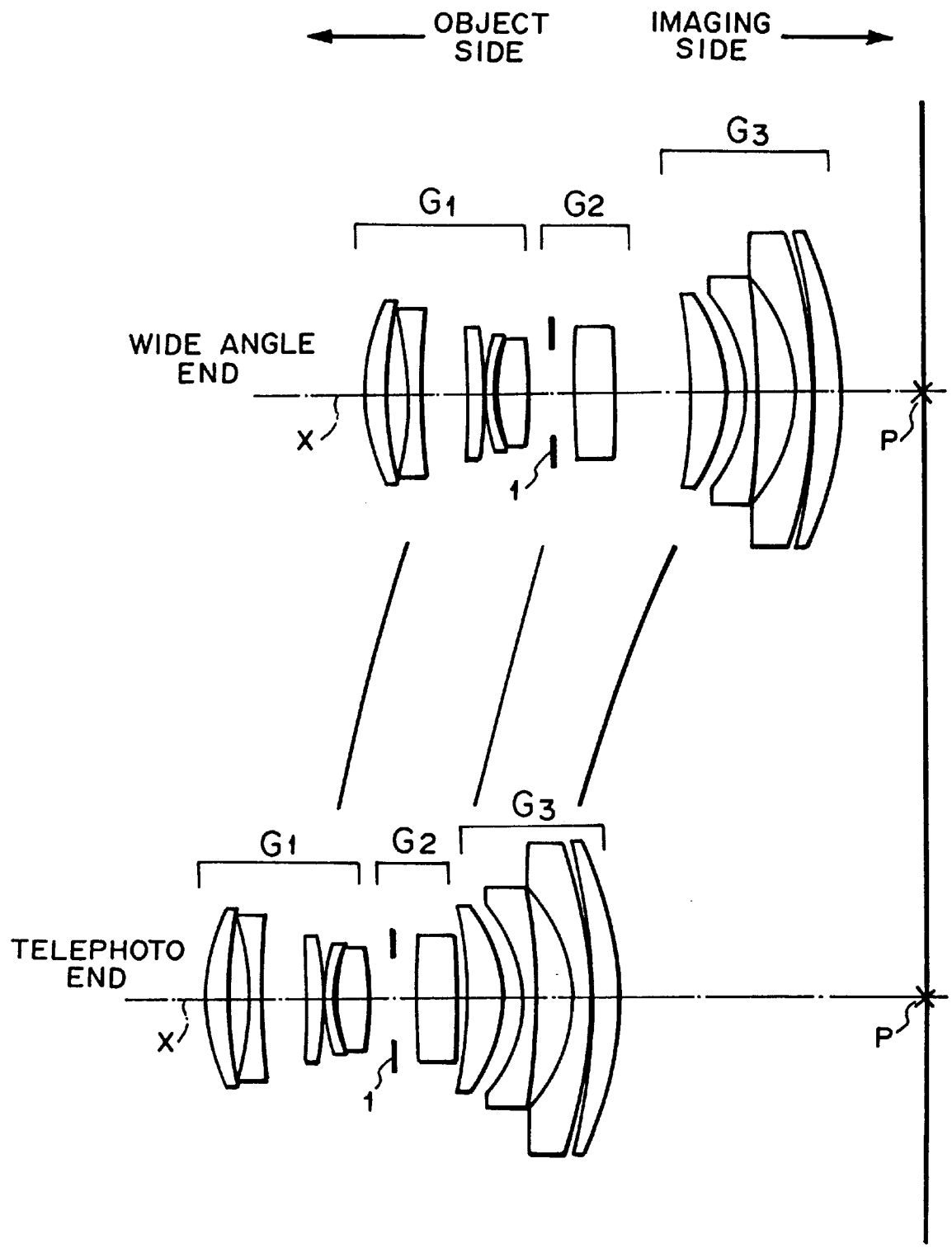
FIG. 2 is a schematic view showing loci of movement of the respective lens groups in the three-group lens in accordance with the embodiment of the present invention from its wide angle end to telephoto end.

A three-group lens in accordance with an embodiment shown in FIG. 1 comprises, successively from an object side, a first lens group $G_1$, constituted by five sheets of lenses $L_1$ to $L_5$, having a positive refracting power as a whole; a second lens group $G_2$, constituted by a single sheet of a lens $L_6$, having a positive refracting power; and a third lens group $G_3$, constituted by four sheets of lenses $L_7$ to $L_{10}$, having a negative refracting power as a whole. The first lens group $G_1$, the second lens group $G_2$, and the third lens group $G_3$ are configured such that, upon zooming, when the power is changed from the wide angle end to telephoto end, as shown in FIG. 2, the air gap between the first lens group $G_1$ and the second lens group $G_2$ increases while the air gap between the second lens group $G_2$ and the third lens group $G_3$ decreases. In this zoom lens, as the lens groups move along its optical axis X while changing the distances between the lens groups, a focal length f of the whole system changes, and a luminous flux is efficiently converged onto an imaging position P on an imaging surface. In the second lens group $G_2$, a stop 1 is disposed in front of the lens $L_6$.

The first lens group $G_1$ comprises, successively from the object side, the first lens $L_1$ made of a positive meniscus lens having a convex surface directed onto the object side; the second lens $L_2$ made of a biconcave lens having a surface with a stronger curvature directed onto the object side; the third lens $L_3$ made of a positive meniscus lens having a convex surface directed onto the imaging surface side; the fourth lens $L_4$ made of a negative meniscus lens having a convex surface directed onto the object side; and the fifth lens $L_5$ made of a biconvex lens having a surface with a stronger curvature directed onto the object side. The second lens group $G_2$ comprises the sixth lens $L_6$ made of a biconvex lens. The third lens group $G_3$ comprises, successively from the object side, the seventh lens $L_7$ made of a positive meniscus lens having a convex surface directed onto the imaging surface side; the eighth lens $L_8$ made of a negative meniscus lens having a convex surface directed onto the imaging surface side; the ninth lens $L_9$ made of a negative meniscus lens having a convex surface directed onto the imaging surface side; and the tenth lens $L_{10}$ made of a positive meniscus lens having a convex surface directed onto the imaging surface side.

Further, this zoom lens satisfies the following conditional expressions:

$$2.2 \leq f_2/f_1 \leq 6.6 \quad (1)$$

$$2.2 \leq f_2/f_w \leq 5.0 \quad (2)$$

$$-1.1 \leq R_3/f_w \leq 0.5 \quad (3)$$

wherein $f_1$ is a focal length of the first lens group;

$f_2$ is a focal length of the second lens group;

$f_w$ is a focal length of the whole system at the wide angle end; and $R_3$ is a radius of curvature of a surface of the second lens on the object side.

When the form of each lens is specified as mentioned above, and the above-mentioned conditional expressions are satisfied, various kinds of aberration in a wide range of photographing from long shot to close-up shot can be corrected favorably, whereby high optical performances can be obtained throughout the object distance. Also, as the first lens group is configured as mentioned above, the ratio of lens corner illumination at the wide angle end can be ameliorated.

In the following, the technical meaning of each conditional expression will be explained.

Above the upper limit of the above-mentioned conditional expression (1), when focusing with the first lens group, spherical aberration increases so much that image surface curvature fluctuates greatly upon focusing at close range, thus making it hard to correct.

Below the lower limit of conditional expression (1), by contrast, the amount of focusing at close range becomes so large that the lens system increases its size, thereby making the main body of the camera bulky. Also, distortion increases so much that it becomes hard to correct.

Also, above the upper limit of conditional expression (2), when focusing with the first lens group, image surface curvature fluctuates greatly upon focusing at close range, thereby making it hard to correct.

Below the lower limit of conditional expression (2), by contrast, the second lens group has a higher sensitivity to eccentricity, whereby its manufacture becomes difficult.

Above the upper limit of conditional expression (3), image surface curvature increases so much that it becomes hard to correct.

Below the lower limit of conditional expression (3), by contrast, coma increases so much that it becomes hard to correct.

When the third lens group is constituted by the above-mentioned four sheets of lenses, chromatic aberration in magnification can be corrected favorably.

In the following, the above-mentioned three-group zoom lens will be explained with reference to specific examples.

EXAMPLE 1

Table 1 (follows) shows radius of curvature R (mm) of each lens surface, center thickness of each lens and air gap between neighboring lenses (hereinafter collectively referred to as axial surface spacing) d (mm), and values of refractive index n and Abbe number υ of each lens at d-line in the zoom lens in accordance with Example 1.

The numbers in this table successively increase from the object side.

In this example, focal length f' and Fno of the whole lens system, and values of $f_2/f_1$, $f_2/f_w$, and $R_3/f_w$ are set as shown in the lower part of Table 1.

EXAMPLE 2

Table 2 (follows) shows radius of curvature R (mm) of each lens surface, axial surface spacing d (mm), and values of refractive index n and Abbe number υ of each lens at d-line in the zoom lens in accordance with Example 2.

The numbers in this table successively increase from the object side.

In this example, focal length f' and Fno of the whole lens system, and values of $f_2/f_1$, $f_2/f_w$, and $R_3/f_w$ are set as shown in the lower part of Table 2.

EXAMPLE 3

Table 3 (follows) shows radius of curvature R (mm) of each lens surface, axial surface spacing d (mm), and values of refractive index n and Abbe number υ of each lens at d-line in the zoom lens in accordance with Example 3.

The numbers in this table successively increase from the object side.

In this example, focal length f and Fno of the whole lens system, and values of $f_2/f_1$, $f_2/f_w$, and $R_3/f_w$ are set as shown in the lower part of Table 3.

EXAMPLE 4

Table 4 (follows) shows radius of curvature R (mm) of each lens surface, axial surface spacing d (mm), and values of refractive index n and Abbe number υ of each lens at d-line in the zoom lens in accordance with Example 4.

The numbers in this table successively increase from the object side.

In this example, focal length f and Fno of the whole lens system, and values of $f_2/f_1$, $f_2/f_w$, and $R_3/f_w$ are set as shown in the lower part of Table 4.

EXAMPLE 5

Table 5 (follows) shows radius of curvature R (mm) of each lens surface, axial surface spacing d (mm), and values of refractive index n and Abbe number υ of each lens at d-line in the zoom lens in accordance with Example 5.

The numbers in this table successively increase from the object side.

In this example, focal length f and Fno of the whole lens system, and values of $f_2/f_1$, $f_2/f_w$, and $R_3/f_w$ are set as shown in the lower part of Table 5.

Figures 1, 6A:
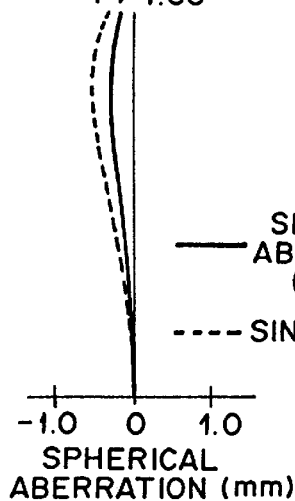
Figures 2, 6A:
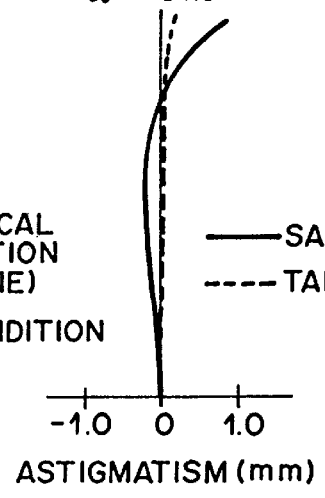
Figures 3, 6A:
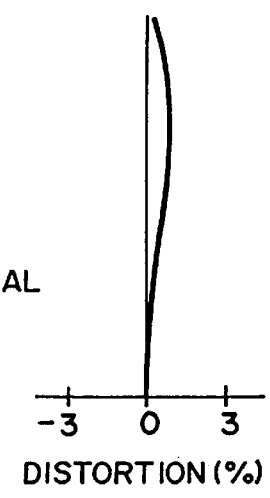
Figures 1, 6B:
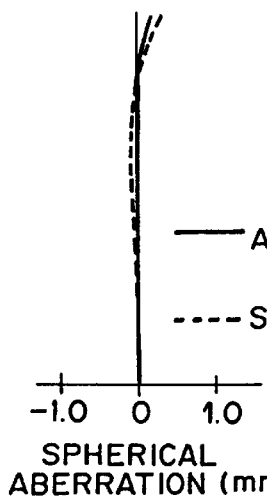
Figures 2, 6B:
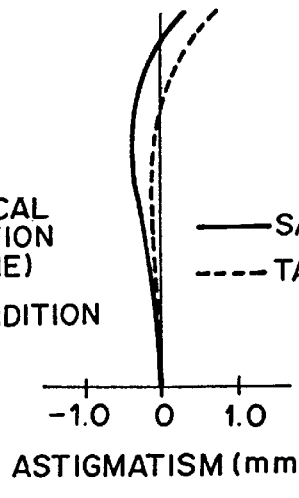
Figures 3, 6B:
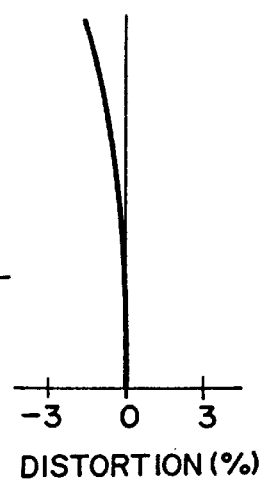

FIGS. 3(3A-1 to 3B-3), 6(6A-1 to 6B-3), 9(9A-1 to 9B-3), 12(12A-1 to 12B-3), and 15(15A-1 to 15B-3) are aberration charts showing spherical aberration, astigmatism, and distortion of the three-group zoom lenses of the respective examples at both wide angle end and telephoto end. FIGS. 4, 7, 10, 13, and 16 are aberration charts showing coma of the three-group zoom lenses of the respective examples at the wide angle end. FIGS. 5, 8, 11, 14, and 17 are aberration charts showing coma of the three-group zoom lenses of the respective examples at the telephoto end. Each spherical aberration chart shows a sine condition in addition to spherical aberration. Each astigmatism chart shows respective aberrations with respect to sagittal (S) and tangential (T) image surfaces. As can be seen from these aberration charts, each kind of aberration can be favorably corrected in the three-group zoom lens of each embodiment mentioned above.

The compact three-group zoom lens of the present invention should not be restricted to the above-mentioned examples. For example, the forms and number of sheets of lenses constituting each lens group can be selected appropriately. Also, for example, the fourth lens subgroup is at least composed of at least one positive refracting lens and at least one negative refracting lens constituting the first lens group, any of the positive and negative lenses can be disposed on the object side.

The three-group zoom lens in accordance with the present invention has an F number of about 4.6 and an angle of view of about 63 degrees at its wide angle end, and an F number of about 7.0 at its telephoto end, thus yielding a variable power ratio of about 1.5, whereby various kinds of aberration can be favorably corrected in a wide range of photographing from long shot to close-up shot. Accordingly, a high resolution and a high contrast can be obtained throughout the object distance to such an extent that professionals and high-standard amateurs can be satisfied.

TABLE 1

| Surface | R | d | n | ν |
|---|---|---|---|---|
| 1 | 51.7343 | 4.17 | 1.75281 | 52.7 |
| 2 | 94.0155 | 4.73 | | |
| 3 | −64.4647 | 2.66 | 1.70465 | 47.4 |
| 4 | 283.7263 | 9.51 | | |
| 5 | −280.7411 | 4.07 | 1.51047 | 64.0 |
| 6 | −109.3292 | 0.18 | | |
| 7 | 55.5030 | 1.98 | 1.64465 | 34.7 |
| 8 | 32.1745 | 0.29 | | |
| 9 | 35.5499 | 7.79 | 1.48951 | 64.9 |
| 10 | −66.8000 | 3.10 to 5.31 | | |
| 11 | 0.0000 | 5.70 | | |
| 12 | 177.0088 | 9.31 | 1.64796 | 55.5 |
| 13 | −1922.5486 | 22.26 to 2.19 | | |
| 14 | −111.1019 | 9.20 | 1.49383 | 63.3 |
| 15 | −36.7569 | 4.68 | | |
| 16 | −38.2637 | 3.10 | 1.49835 | 65.0 |
| 17 | −162.2179 | 8.32 | | |
| 18 | −38.5418 | 4.16 | 1.80501 | 47.5 |
| 19 | −155.5066 | 0.22 | | |
| 20 | −147.5118 | 4.71 | 1.80144 | 24.9 |
| 21 | −110.6366 | | | | f=100.00 to 153.80 Fno.=4.63 to 7.13
$f_2/f_1$=2.51
$f_2/f_w$=2.51
$R_3/f_w$=−0.64

TABLE 2

| Surface | R | d | n | ν |
|---|---|---|---|---|
| 1 | 48.9087 | 4.33 | 1.73150 | 51.7 |
| 2 | 93.3683 | 4.41 | | |
| 3 | −69.0702 | 2.66 | 1.80501 | 47.4 |
| 4 | 236.1169 | 10.73 | | |
| 5 | −509.0070 | 4.07 | 1.48500 | 65.4 |
| 6 | −100.6244 | 0.18 | | |
| 7 | 49.6916 | 1.95 | 1.69285 | 31.9 |
| 8 | 30.7467 | 0.38 | | |
| 9 | 34.8866 | 7.35 | 1.57556 | 59.9 |
| 10 | −80.6320 | 2.66 to 5.31 | | |
| 11 | 0.0000 | 5.14 | | |
| 12 | 410.5979 | 9.45 | 1.49556 | 65.1 |
| 13 | −486.1689 | 20.34 to 2.06 | | |
| 14 | −105.8801 | 8.62 | 1.66550 | 52.7 |
| 15 | −35.9059 | 4.20 | | |
| 16 | −34.1217 | 3.10 | 1.80501 | 47.4 |
| 17 | −139.2947 | 7.90 | | |
| 18 | −37.5228 | 4.16 | 1.80317 | 47.6 |
| 19 | −111.2683 | 0.18 | | |
| 20 | −142.8805 | 5.94 | 1.80500 | 24.7 |
| 21 | −92.3095 | | | | f=100.00 to 153.81 Fno.=4.63 to 7.13
$f_2/f_1$=5.74
$f_2/f_w$=4.51
$R_3/f_w$=−0.69

TABLE 3

| Surface | R | d | n | ν |
|---|---|---|---|---|
| 1 | 46.2086 | 3.74 | 1.76715 | 43.5 |
| 2 | 74.8365 | 4.52 | | |
| 3 | −54.8957 | 2.63 | 1.80501 | 47.4 |
| 4 | 356.2013 | 6.82 | | |
| 5 | −315.7873 | 4.03 | 1.55371 | 61.7 |
| 6 | −90.1703 | 0.18 | | |

TABLE 3-continued

| Surface | R | d | n | ν |
|---|---|---|---|---|
| 7 | 51.6415 | 1.93 | 1.80500 | 31.3 |
| 8 | 30.9629 | 0.27 | | |
| 9 | 33.9580 | 8.04 | 1.57392 | 58.3 |
| 10 | −62.9161 | 3.51 to 5.26 | | |
| 11 | 0.0000 | 5.08 | | |
| 12 | 175.2599 | 9.35 | 1.51408 | 64.4 |
| 13 | −433.2712 | 16.98 to 2.03 | | |
| 14 | −104.9397 | 9.36 | 1.52586 | 60.0 |
| 15 | −34.8728 | 5.16 | | |
| 16 | −34.0584 | 4.34 | 1.72489 | 53.0 |
| 17 | −176.5921 | 9.04 | | |
| 18 | −37.0690 | 4.12 | 1.76936 | 51.0 |
| 19 | −116.5340 | 0.26 | | |
| 20 | −145.8484 | 5.94 | 1.80501 | 24.7 |
| 21 | −92.0436 | | | | f'=100.00 to 153.85 Fno.=4.63 to 7.13

$f_2/f_1 = 2.84$
$f_2/f_w = 2.44$
$R_3/f_w = -0.55$

TABLE 4

| Surface | R | d | n | ν |
|---|---|---|---|---|
| 1 | 50.7484 | 5.73 | 1.71725 | 55.6 |
| 2 | 173.9600 | 3.44 | | |
| 3 | −99.7978 | 2.65 | 1.80501 | 45.2 |
| 4 | 104.6960 | 12.75 | | |
| 5 | −280.9465 | 4.07 | 1.48500 | 65.1 |
| 6 | −143.2412 | 0.55 | | |
| 7 | 51.8286 | 1.94 | 1.61868 | 36.1 |
| 8 | 31.2293 | 0.36 | | |
| 9 | 36.1151 | 6.42 | 1.58776 | 61.5 |
| 10 | −94.9104 | 3.53 to 5.30 | | |
| 11 | 0.0000 | 5.13 | | |
| 12 | 946.9778 | 9.69 | 1.62208 | 60.3 |
| 13 | −188.4805 | 18.04 to 1.79 | | |
| 14 | −97.5346 | 8.47 | 1.61775 | 60.1 |
| 15 | −34.2705 | 4.29 | | |
| 16 | −33.9980 | 3.09 | 1.80502 | 47.4 |
| 17 | −123.0461 | 8.02 | | |
| 18 | −35.0322 | 4.15 | 1.80500 | 47.5 |
| 19 | −105.8040 | 0.18 | | |
| 20 | −147.2813 | 6.09 | 1.80500 | 24.7 |
| 21 | −91.7896 | | | | f'=100.00 to 153.76 Fno.=4.63 to 7.13

$f_2/f_1 = 2.97$
$f_2/f_w = 2.54$
$R_3/f_w = -1.00$

TABLE 5

| Surface | R | d | n | ν |
|---|---|---|---|---|
| 1 | 48.8739 | 4.69 | 1.71300 | 53.9 |
| 2 | 93.4123 | 5.06 | | |
| 3 | −70.3083 | 2.63 | 1.80236 | 46.7 |
| 4 | 246.3973 | 10.31 | | |
| 5 | −487.5404 | 4.07 | 1.48749 | 70.4 |
| 6 | −106.1721 | 0.18 | | |
| 7 | 49.1490 | 1.90 | 1.64769 | 33.9 |
| 8 | 30.2817 | 0.42 | | |
| 9 | 34.9311 | 7.81 | 1.56384 | 60.8 |
| 10 | −82.5127 | 4.76 to 5.29 | | |

TABLE 5-continued

| Surface | R | d | n | ν |
|---|---|---|---|---|
| 11 | 0.0000 | 5.11 | | |
| 12 | 290.1405 | 9.49 | 1.48749 | 70.4 |
| 13 | −290.1405 | 17.46 to 1.97 | | |
| 14 | −98.7423 | 8.15 | 1.64850 | 53.0 |
| 15 | −35.0651 | 4.48 | | |
| 16 | −33.1503 | 3.05 | 1.80236 | 46.7 |
| 17 | −163.3521 | 8.41 | | |
| 18 | −37.3695 | 4.11 | 1.80236 | 46.7 |
| 19 | −111.0930 | 0.18 | | |
| 20 | −147.2812 | 5.96 | 1.80517 | 25.5 |
| 21 | −85.4218 | | | | f'=100.00 to 153.80 Fno.=4.63 to 7.13

$f_2/f_1 = 3.66$
$f_2/f_w = 2.99$
$R_3/f_w = -0.70$

What is claimed is:

1. A three-group zoom lens comprising, successively from an object side, a first lens group having a positive refracting power, a second lens group having a positive refracting power, and a third lens group having a negative refracting power, in which, upon changing power from a wide angle end to a telephoto end, the three lens groups are moved toward the object side while changing a distance between said lens groups, so as to change the power;

wherein the first lens group comprises, successively from the object side, a positive refraction first lens having a convex surface directed onto the object side, a negative refraction second lens having a concave surface directed onto the object side, a positive refraction third lens, and a fourth lens subgroup composed of at least one positive refraction and at least one negative refraction lens; and wherein the following conditional expressions:

$$2.2 \leq f_2/f_1 \leq 6.6 \quad (1)$$

$$2.2 \leq f_2/f_w \leq 5.0 \quad (2)$$

$$-1.1 \leq R_3/f_w \leq -0.5 \quad (3)$$

wherein $f_1$ is a focal length of the first lens group;
$f_2$ is a focal length of the second lens group;
$f_w$ is a focal length of the whole system at the wide angle end; and
$R_3$ is a radius of curvature of a surface of the second lens on the object side are satisfied.

2. A three-group zoom lens according to claim 1, wherein the zoom lens is configured such that, upon changing the power from the wide angle end to the telephoto end, an air gap between the first lens group and the second lens group increases, while an air gap between the second lens group and the third lens group decreases.

3. A three-group zoom lens according to claim 1, wherein the third lens group comprises four sheets of lenses.

* * * * *